(12) United States Patent
Hamilton, II et al.

(10) Patent No.: US 10,639,551 B2
(45) Date of Patent: *May 5, 2020

(54) USE OF REAL TIME LOCATION INFORMATION FOR USER AUTHENTICATION AND AUTHORIZATION IN VIRTUAL ENVIRONMENTS

(71) Applicant: International Business Machines Corporation, Armonk, NY (US)

(72) Inventors: Rick A. Hamilton, II, Charlottesville, VA (US); Jenny S. Li, Danbury, CT (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/437,866

(22) Filed: Feb. 21, 2017

(65) Prior Publication Data

US 2017/0165578 A1 Jun. 15, 2017

Related U.S. Application Data

(63) Continuation of application No. 12/500,678, filed on Jul. 10, 2009, now Pat. No. 9,610,502.

(51) Int. Cl.
*G06F 3/048* (2013.01)
*A63F 13/71* (2014.01)
(Continued)

(52) U.S. Cl.
CPC ............ *A63F 13/71* (2014.09); *A63F 13/216* (2014.09); *A63F 13/335* (2014.09); *A63F 13/79* (2014.09);
(Continued)

(58) Field of Classification Search
CPC .. G06F 3/04842; G06F 3/0484; G06F 3/0481; G06F 3/04815
See application file for complete search history.

(56) References Cited

U.S. PATENT DOCUMENTS 6,002,853 A * 12/1999 de Hond ................. G06F 16/10
709/219
6,219,045 B1 * 4/2001 Leahy ................... H04W 4/029
715/757

(Continued)

*Primary Examiner* — Nicholas Augustine
(74) *Attorney, Agent, or Firm* — Peter J. Edwards

(57) ABSTRACT

Provided is a method for authentication and verification of a user in a virtual world (VU) based upon such criteria as the physical location of a user in the real world and the logical location of the user's avatar in the VU. The disclosed technology combines physical and application aspects of security to enhance security options within virtual environments. In addition to traditional credential-based authentication, physical constraints corresponding to the real world and logical locations in a VU are employed, wherein an authentication server requires each component to be in the proper association state, location or proximity before authenticating a user. Further, the disclosed technology provides for the termination of a user's authentication if the user moves from an approved physical or VU location to an unapproved location. Techniques are provided to track a user's credentials and real-time physical and logical location of a user.

17 Claims, 6 Drawing Sheets

(51) Int. Cl.
*A63F 13/216* (2014.01)
*A63F 13/335* (2014.01)
*A63F 13/79* (2014.01)
*G06F 21/62* (2013.01)
*H04L 9/32* (2006.01)
*H04L 29/06* (2006.01)
*H04L 29/08* (2006.01)
*G06F 3/01* (2006.01)

(52) U.S. Cl.
CPC ............ *G06F 21/6218* (2013.01); *H04L 9/32* (2013.01); *H04L 63/08* (2013.01); *H04L 63/107* (2013.01); *H04L 63/168* (2013.01); *H04L 67/18* (2013.01); *H04L 67/38* (2013.01); *A63F 2300/205* (2013.01); *A63F 2300/401* (2013.01); *A63F 2300/5533* (2013.01); *A63F 2300/5573* (2013.01); *A63F 2300/8082* (2013.01); *H04L 2209/805* (2013.01)

(56) References Cited

U.S. PATENT DOCUMENTS

| | | | |
|---|---|---|---|
| 6,308,273 B1 | 10/2001 | Goertzel et al. | |
| 6,414,679 B1* | 7/2002 | Miodonski | G06F 17/5004 345/420 |
| 6,570,563 B1* | 5/2003 | Honda | G06T 19/00 345/419 |
| 6,573,903 B2* | 6/2003 | Gantt | G06F 17/50 345/619 |
| 6,732,277 B1 | 5/2004 | Vandergeest et al. | |
| 6,961,055 B2* | 11/2005 | Doak | G06T 19/00 345/419 |
| 7,746,343 B1* | 6/2010 | Charaniya | G06F 16/9537 345/428 |
| 7,788,323 B2* | 8/2010 | Greenstein | G06T 19/00 709/204 |
| 7,817,150 B2* | 10/2010 | Reichard | G06T 19/00 345/419 |
| 7,844,724 B2* | 11/2010 | Van Wie | H04L 12/1827 709/223 |
| 2001/0018667 A1* | 8/2001 | Kim | G06Q 30/02 705/14.73 |
| 2002/0113820 A1* | 8/2002 | Robinson | G06F 16/954 715/764 |
| 2005/0093719 A1* | 5/2005 | Okamoto | G01C 21/365 340/995.1 |
| 2006/0242237 A1 | 10/2006 | Manion et al. | |
| 2009/0307611 A1* | 12/2009 | Riley | G06F 16/444 715/757 |
| 2010/0050237 A1* | 2/2010 | Bokor | G06F 16/9537 726/4 |

\* cited by examiner

USE OF REAL TIME LOCATION INFORMATION FOR USER AUTHENTICATION AND AUTHORIZATION IN VIRTUAL ENVIRONMENTS

CROSS-REFERENCES TO RELATED APPLICATIONS

The present application is a continuation and claims the benefit of the filing date of an application entitled, "Use of Real Time Location Information for User Authentication and Authorization in Virtual Environments" Ser. No. 12/500,678, filed Jul. 10, 2009, assigned to the assignee of the present application, and herein incorporated by reference

TECHNICAL FIELD

The claimed subject matter relates generally to virtual universes and, more specifically, to a method for authenticating and authorizing a user within a virtual universe.

DESCRIPTION OF THE RELATED ART

The advent of the Internet during the 1990's opened up new avenues of communication among computer users around the world. Both personal users and businesses established identities on the Internet for both recreation and commercial reasons. During the past two decades, traffic on the Internet has increased exponentially and available context has expanded into areas that were previously either unimagined or impossible. One such context is the development of virtual universes ("VUs"), one example of which is the Second Life platform ("SL"), supported by Linden Research, Inc., or "Linden Labs," of San Francisco, Calif. Other examples include Entropia Universe, Sims Online, There, Red Light Center as well as massively multiplayer games such as EverQuest, Ultima Online, Lineage and World of Warcraft.

Basically, a VU is an Internet-based simulated environment in which users interact via "avatars," or computer representations of a user. Often a VU resembles the real world with respect to such things as physics and object, e.g. houses and landscapes. Other terms for a VU are a "metaverse" and "3D Internet," VU users are presented with perceptual stimuli and typically are able to both manipulate elements of the VU and communicate with other users via the avatars. Many VUs even have their own economies in which users exchange virtual dollars for goods and services. Between the founding of SL in 2003 and March of 2008, approximately 13 million users have registered. In addition, VU business and other types of offices have been introduced. In fact, Sweden opened an embassy in SL in 2007.

Other functions have been proposed and await structure and governance similar to environments outside of the VU. One such use is the management and control of real-world resources using an avatar in a VU working with a virtual interface. Currently users authenticate to a VU with traditional user name/password credentials.

The following definitions explain a few of the basic concepts of a VU:

Avatar: VU user's representation of him or herself in the VU that other users can see, often taking the form of a cartoon-like human.

Agent: particular user's account, upon which the user can build an avatar and which is tied to an inventory of assets owned by the user.

Region: virtual area of land within a VU, typically residing upon a single computer server.

Assets, avatars, the VU environment and anything visual within a VU is associated with a unique identifier (UUID) tied to geometric data, which is distributed to users as textual coordinates, textures, which are distributed as graphics files, and effects data, which are rendered by a user's client process according to the user's preferences and the user's device capabilities.

SUMMARY OF THE CLAIMED SUBJECT MATTER

Provided is a method for authentication and verification of a user in a virtual world (VU). Current authentication methods do not consider unique VU specific requirements and criteria for authentication and verification. The disclosed technology provides, but is not limited to, authentication and verification based upon such criteria as the physical location of a user in the real world and the logical location of the user's avatar in the VU. For example, an avatar may be authorized to work in a particular virtual data-center in the VU while the user is physically located in McLean. Virginia but not be authorized if the user's current physical location is China. In addition, an avatar authorized to access an application from a VU space hosted in North America may not be authorized to access the same space from a VU space located in Germany.

The disclosed technology combines physical and application aspects of security to enhance security options within virtual environments. In addition to traditional credential-based authentication, physical constraints corresponding to the real world and logical locations in a VU are employed, wherein an authentication server requires each component to be in the proper association state, location or proximity before authenticating a user.

Further, the disclosed technology provides for the termination of a use's authentication if the user moves from an approved physical or VU location to an unapproved location. Techniques are provided to track a user's credentials and real-time physical and logical location of a user. The physical location of a user may be determined by many currently known of future tracking methods, including, but not limited to, radio-frequency identification ((RFID), Global positioning system (GPS), address space, routing, and so on.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to a virtual world (VU), the claimed subject matter can be implemented in any information technology (IT) system in which manipulation of real-world objects by computer-generated entities is practiced. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains or stores the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium, either currently existing or yet to be developed, upon which a program and/or data may be stored.

Figure 1:
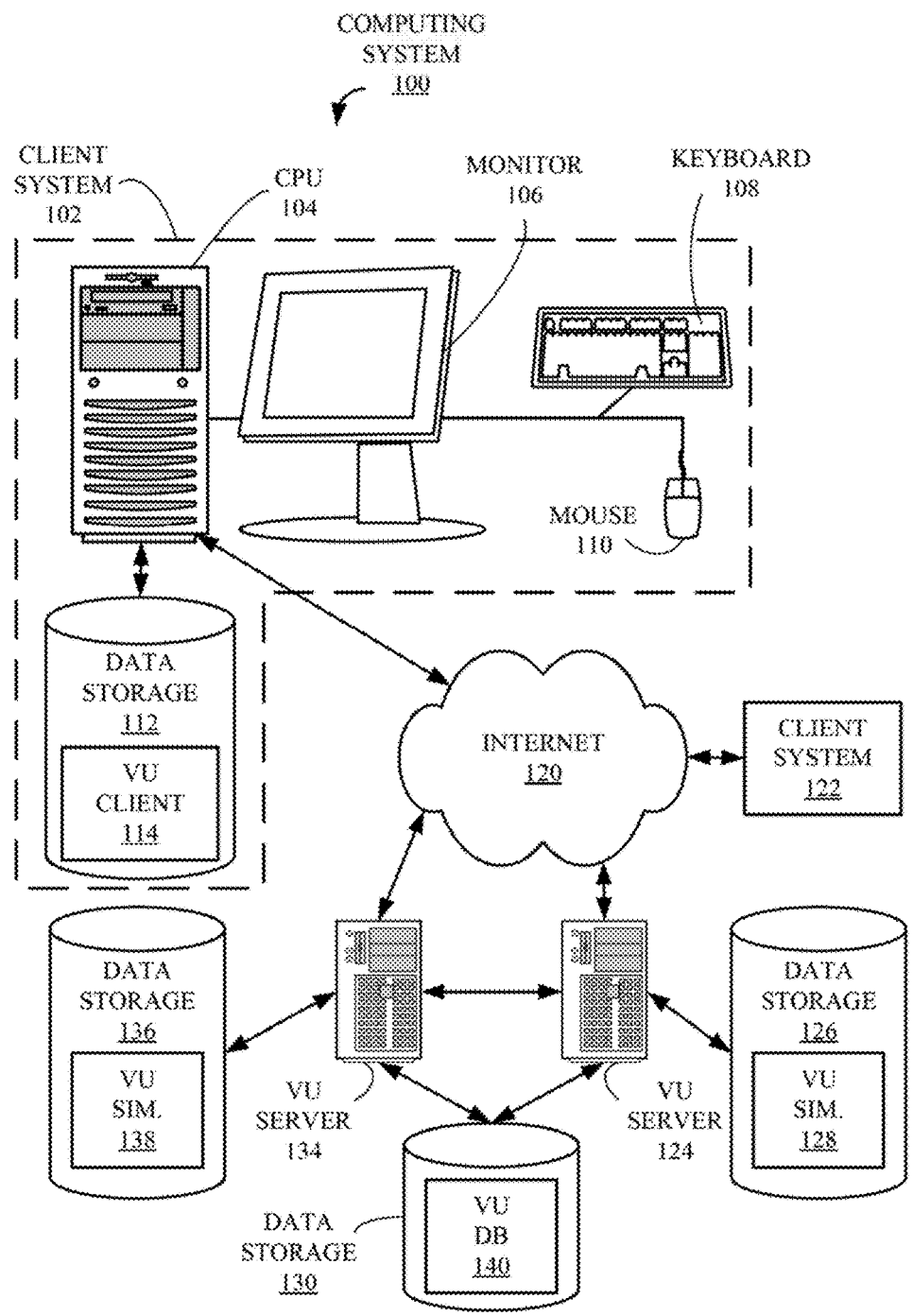
FIG. 1 is a computing architecture that supports one example if a virtual world and the techniques of the claimed subject matter.

Turning now to the figures, FIG. 1 is a block diagram of one example of a computing system architecture 100 that incorporates the techniques claimed subject matter. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an example of a virtual universe (VU) client application 114. VU client executes on CPU 104 to display and enable interaction with a virtual universe 200 (see FIG. 2). The function of VU client 114 is described in detail below in conjunction with FIGS. 2-6. Also illustrated is a second client system 122, which would similar to client system 102, but is not shown in detail for the sale of simplicity.

Client systems 102 and 122 are connected to the Internet 120, which is also connected to a VU server, or simply a "server," 124 and a VU server 134. Servers 124 and 134 each include many of the same components as client system 102, including a CPU, a monitor, a keyboard and a mouse. These components should be familiar to one with skill in the computing arts and, for the sale of simplicity, are not illustrated. Servers 124 and 134 are each coupled to data storage, i.e. data storage 126 and data storage 136, respectively. Servers 124 and 134 function as VU servers, i.e. are responsible for transmitting data corresponding to particular areas, or "regions," of VU 200 to VU client 114 so that VU 200 can be instantiated on client system 102. Virtual world 200 is instantiated by the execution of VU simulators (sim.) 128 and 138, stored on the respective data storage 126 and 136 and VU servers 124 and 134, in coordination with VU client 114. Servers 124 and 134 are also couples to a centralized data storage 130 that includes a VU database 140, which may be executing on a separate server (not shown) and part of a database management system (DBMS) (not shown). Further, database 140 could be, and typically is, a centralized database with multiple servers (not shown).

Although in this example, client systems 102 and 122 and servers 124 and 134 are communicatively coupled via the Internet 120, they could also be coupled through any number of communication mediums such as, but not limited to, a local area network (LAN) (not shown). Further, it should be noted there are many possible computing system configurations, of which computing system 100 is only one simple example. It should be noted that a typical VU could involve dozens if not hundreds of servers and perhaps hundreds if not thousands of clients but for the sake of simplicity only two are shown.

Figure 2:
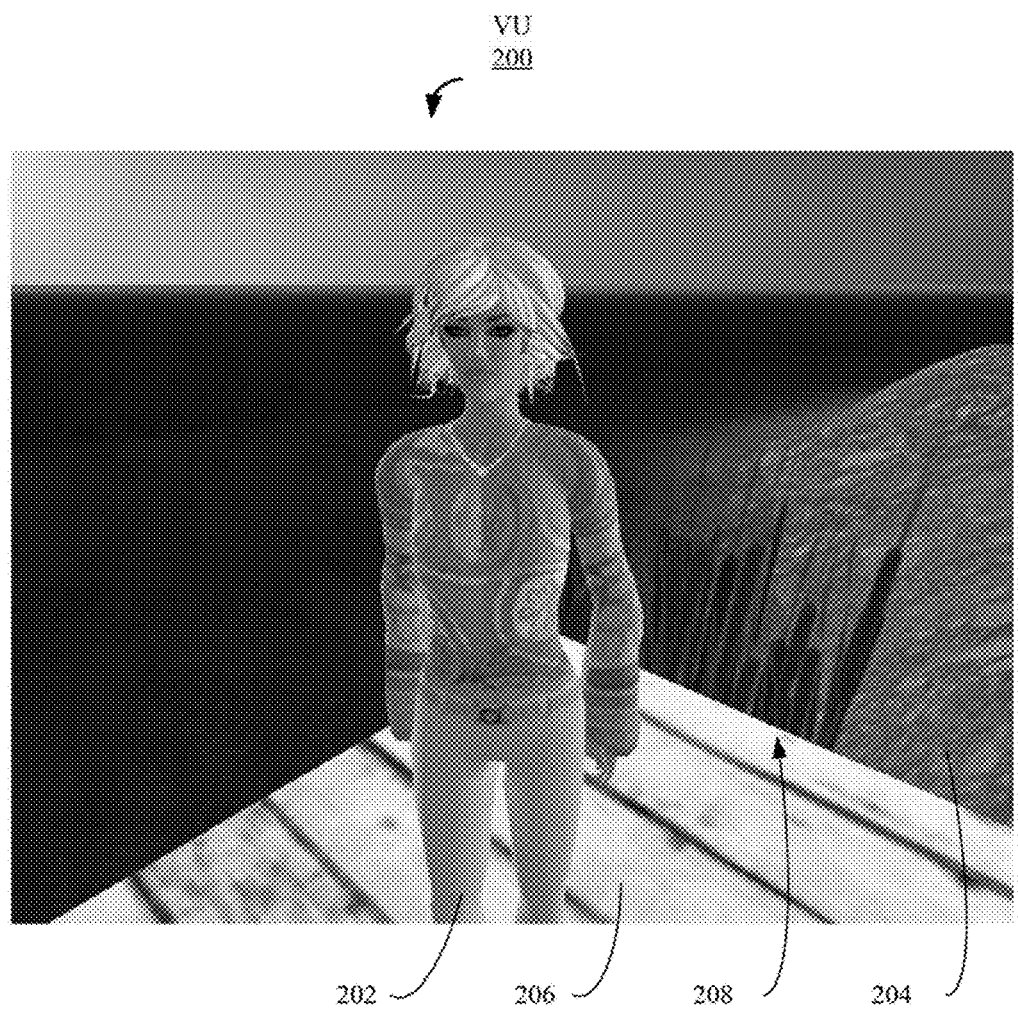
FIG. 2 is a screen shot of a virtual word, illustrating an avatar, a region and various objects within the region.

FIG. 2 is an illustration of a virtual word (VU) 200, including an avatar 202 and various objects 204, 206 and 208. In this example, VU 200 is displayed on monitor 106 (FIG. 1) for the benefit of a user of client system 102 and avatar 202 represents the user in VU 200. Object 204 represents a particular area, or "region," of VU 200, although only a portion of region 204 is typically displayed at any point in time. Region 204 includes a platform 206 on which avatar 202 appears to be standing. In this illustration, object 208 represents plant life. Objects 204 and 206 are examples of various items that may be added to a region to make the region appear more like the real world.

Information necessary to display VU 200, avatar 202 and objects 204, 206 and 208 is stored in VU DB 140 (FIG. 1). The control of avatar 202 is executed by the user in conjunction with VU client 114 and one of VU servers 124 and 134. Typically, each server 124 and 134 is responsible of a particular region, or grid, of VU 200. In the following examples, the rendering of region 204 is the responsibility of VU simulator 128 executing VU server 124.

Figure 3:
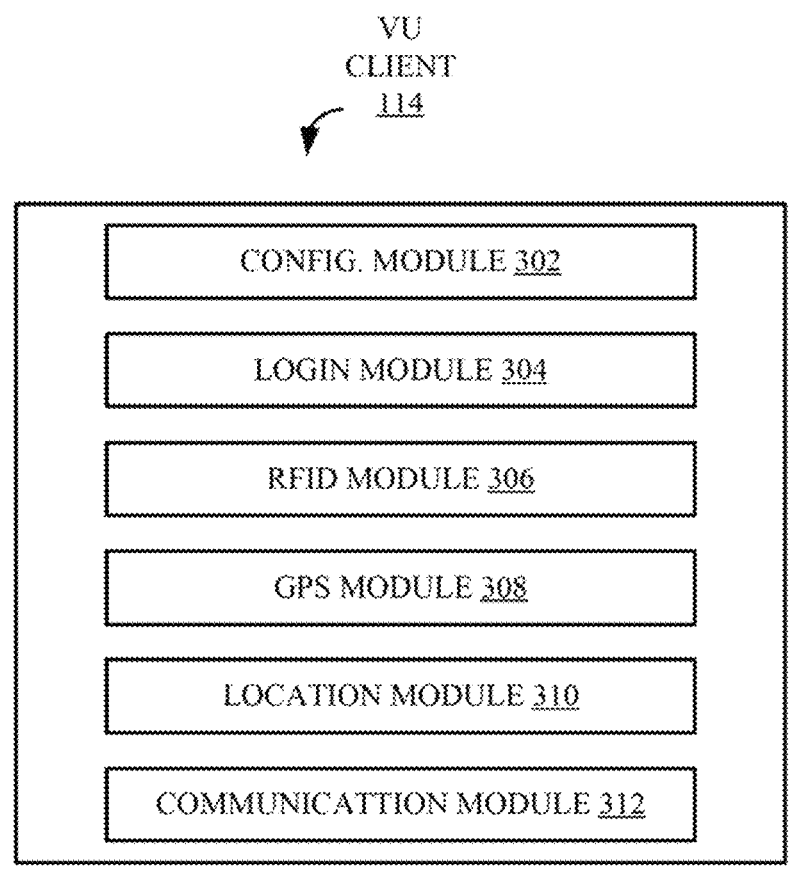
FIG. 3 is a block diagram of VU client module, first introduced in FIG. 1, in more detail.

FIG. 3 is a block diagram of VU client module 114, first introduced in FIG. 1, in more detail. In this example, VU client 114 is stored in data storage 112 (FIG. 1) and executes on CPU 104 (FIG. 1) of client system 102 (FIG. 1). It should be noted that VU client 114 is would typically include mode components then those illustrated in FIG. 3 but for the sale of simplicity only those components with particular relevance to the claimed subject matter are shown. In addition, any particular embodiment of the claimed subject matter may not include each of these components. Although one embodiment employs all the features represented by the described components, other embodiments implement only the features associated with particular components.

In this example, VU client 114 includes a configuration (config.) module 302, a login module 304, a radio frequency identification (RFID) module 306, a global positioning system (GPS) module 308, a location module 310 and a communication module 312. Configuration module 302 stored information necessary for the intiatil configuration and execution of VU client 114. Login module 304 executes typical login authentication and verification procedures. In addition, login module 304 implements various activities associated with a Setup Location Monitor and Control (SLMC) process 500 (see FIG. 5). RFID module 306 receives input from a RDID tag (not shown) associated with associated either with the particular user (not shown) or client system executing VU client 114. In the following example, VU client is executing on client system 102 (FIG. 1) and displaying VU 200 (FIG. 2), including avatar 202 (FIG. 2). In other words, the user represented by avatar 202 is interacting with client system 102 and the RFID tag providing data to RFID module 306 is attached either to client system 102 or the user using client system 102. In a similar fashion, GPS module 308 receives input from a GPS device (not shown) associated with either client system 102 or the user using client system 102.

Location Module 310 receives data from one or both of RFID module 306 and GPS module 308, depending upon the particular configuration, and calculates the physical location in the real world of the RFID tag and/or GPS device, respectively. The location information calculated by location module 310 is employed by VU simulator 128 (FIG. 1) and a Location Control Module (LCM) 420 (see FIG. 4) to determine whether or not to enable avatar 202 to either enter a specific location in VU 200 or control permitted activities in a particular location. For example, if the specific location is a representation in VU 200 of a nuclear power plant (not shown) that is configured to provide actual control of the corresponding power plant, a particular avatar such as avatar 202 may be allowed access for observation but not given the capacity to manipulate power plant controls.

Communication module 312 is responsible for communication between VU client 114 and, in the following example, VU simulator 128 (see FIG. 4), between modules 306 and 310 and between modules 308 and 310. In addition, module 312 includes logic for ensuring the integrity of data from RFID module 306, GPS module 308 and location module 310. In this manner, a user is not able to "spoof" VU simulator 128 into an incorrect determination of a user's real-world location. Function associated with VU client 114 and modules 302, 304, 306, 308, 310 and 312 are described in more detail below in conjunction with FIGS. 4-6.

It should be noted that although modules 302, 304, 306, 308, 310 and 312 are illustrated as part of VU client 114, certain functionality could also be executed in conjunction with VU simulator module 128 (see FIG. 4), either in addition to or instead of VU client 114. For example, rather than actually calculating either an RFID or GPS position, raw data from RFID and GPS devices may be merely relayed to VU simulator 128 and processing to employ that data executed on VU server 124 (FIG. 1).

Figure 4:
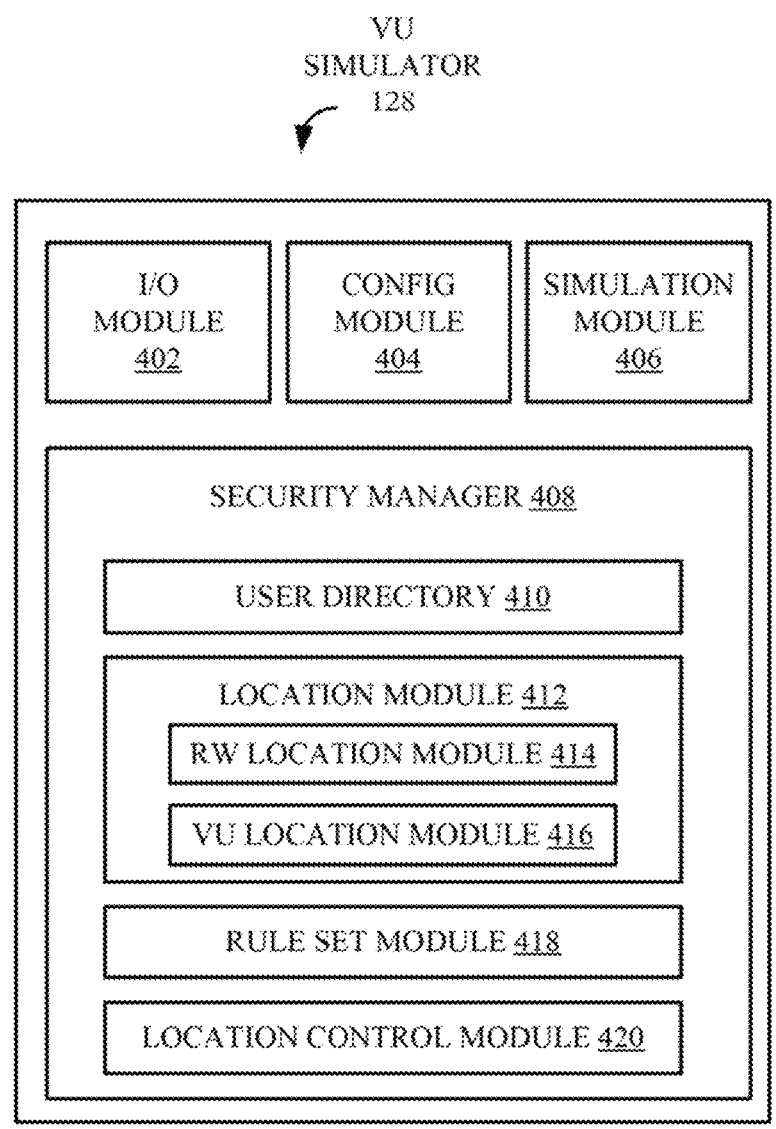
FIG. 4 is a block diagram of VU simulator module, first introduces in FIG. 1, in more detail.

FIG. 4 is a block diagram of VU simulator module 128, first introduced in FIG. 1, in more detail. In this example, VU simulator 128 is stored in data storage 126 and executes on VU server 124. It should be noted that VU simulator 128 is would typically include mode components then those illustrated in FIG. 4 but that for the sale of simplicity only those components with particular relevance to the claimed subject matter are shown. VU simulator includes an input/output (I/O) module 402, a configuration (config.) module 404, a simulation module 406 and a security manager 408.

I/O module 402 handles communication between VU simulator 128 and other entities, including, but not limited to, other applications executing on VU server 124 (FIG. 1), client system 102 (FIG. 1), VU client 114 (FIGS. 1 and 3), VU database 140 and other VU simulators such as VU simulator 138 that are responsible for the generation of other regions of VU 200 that border region 204 (FIG. 2). Config module 404 stores parameters related to various configuration options relating to VU simulator 128. These may include, but are not limited to, number of allowable concurrent VU clients supported, whether or not particular features such as the described security features are enabled and to what degree, information pertaining to the location of VU database 140, information relating to other VU simulators, including relevant proximity, and so on. Simulation module 406 is responsible for the actual generation of a particular virtual world, which in this example is VU 200. It should be noted that, as explained above, a particular VU simulator is typically responsible for the generation of a specific VU region and that, as regions are added to a VU, additional VU simulators are brought online. For the most part, modules 402, 404 and 406 are responsible for the typical functionality associated with a VU such as VU 200. Of course, modules 402, 404 and 406 are also employed to implement functionality associated with the claimed subject matter.

Security manager 408 is responsible for the authentication and authorization of avatars such as avatar 202 (FIG. 2), including typical login and verification functions. In addition, security manager 408 is responsible for the implementation of functionality associated with the claimed subject matter. Security manager 408 includes a user directory 410, a location module 412, a rule set module 418 and a location control module 420. User directory 410 stores information relating to currently executing VU clients such as VU client 114. When a particular user initiates a VU client, information relating to that user and corresponding avatar is retrieved from VU database 140.

Location module 412 includes a real world (RW) location module 414 and a VU location module 416. Real world location 414 stores and calculates information about the current physical location in the real world of a particular user executing a VU client such as VU client 114. This information is received from either or both of RFID module 304 (FIG. 3) and GPS module 306 (FIG. 3) of VU client 114. In addition, RW physical location data may be calculated based upon routing information included in network or other communication messages between VU client 114 and VU simulator 128. VU location module 416 stores and calculates information relating to the simulated location of avatar 202 in VU 200. This information is used both by simulation module 406 to generate the appropriate location in VU 200 and by location control module 420 to control access and functionality of avatar 202 in accordance with the claimed subject matter.

Rule set module 418 stores and calculates information relating to allowable locations, both real world and VU locations, and whether or not a particular action within a particular VU location is permitted by a particular avatar or user. Location control module 420 correlates avatar 202 with both RW location module 414, VU location module 416 and based upon the information stored and calculated by rule set data 418 and stored in user directory 410 determines appropriate actions and locations and limits the same of avatar 202. Functionality associated with VU simulator 128 and modules 402, 404, 406, 408, 410, 412, 414, 416, 418 and 420 are describes in more detail below in conjunction with FIGS. 5 and 6.

In another embodiment, rule set module 418 is set to authenticate and authorize a particular user based upon a combination of the user's physical real-word location (RW) and virtual location. For example, a company's data center is located in Country A and the local administrative staff are on-hand to perform physical management. However, certain administrative tasks on the data center in Country A require approval from a skilled senior administrator located in Country B. Rule set module 418 may be set to authorize the local administrators in Country A to perform certain tasks only if the senior administrator is in a predefined secure location in the data center in the VU. In this example, the RW location of the local administrator in country A and the VU location of the senior administrator are noted by respective location modules 412 and a location control module 420 determines whether or not recorded locations satisfy a rule stored in rule set module 418. If so, the local administrator is authorized to perform the administrative tasks on physical servers in Country A. Those with skill in the computing arts should appreciate that they are many different scenarios, involving both one and multiple parties, that can be defined and enforced in accordance with the claimed subject matter.

Figure 5:
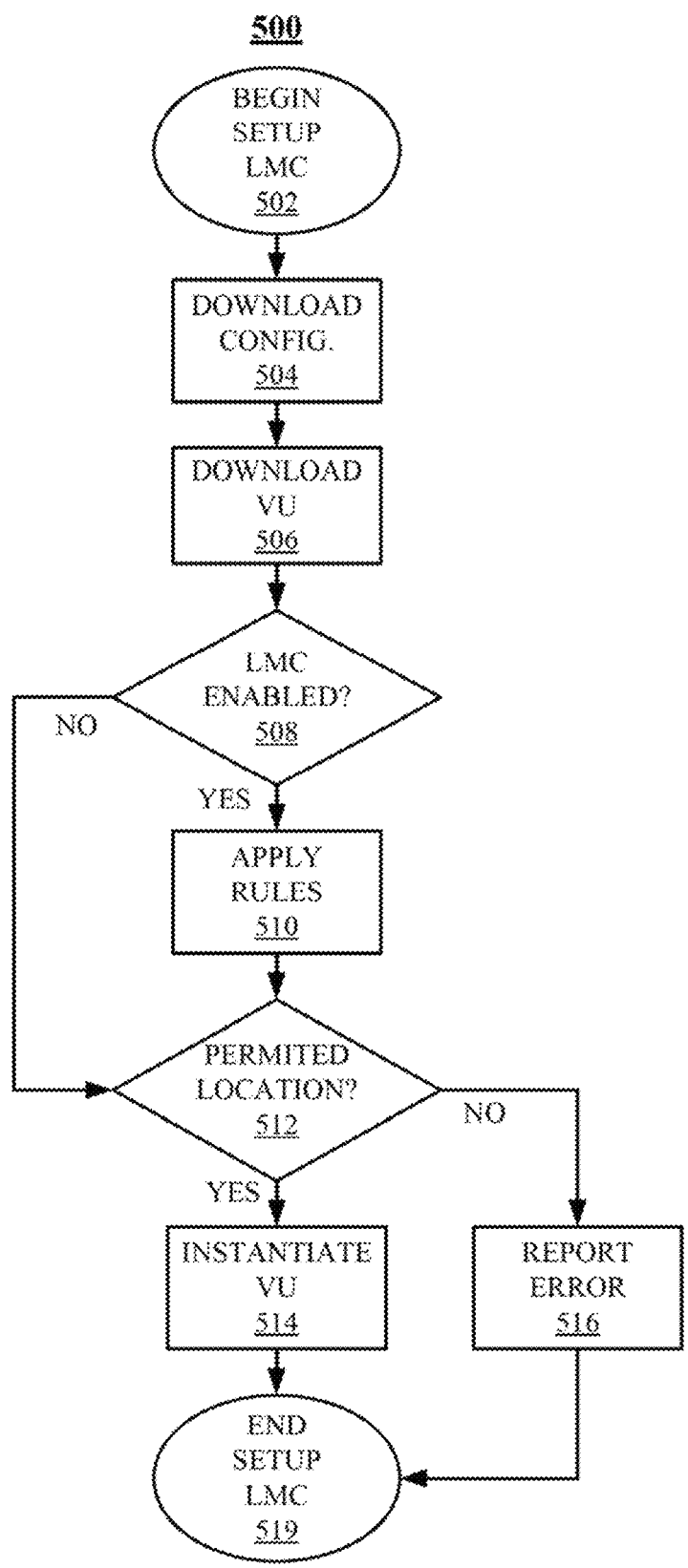
FIG. 5 is a flowchart of a Setup Location Monitor and Control (LMC) process that implements the claimed subject matter.

FIG. 5 is a flowchart of a Setup Location Monitor and Control process 500 that implements the claimed subject matter. In the following example process 500 is stored on data storage 112 (FIG. 1) and executes in conjunction with an initialization process (not shown) of VU client 114 (FIGS. 1 and 3) on CPU 104 (FIG. 1) of client system 102 (FIG. 1). Further, in the following example, a user (not shown) using client system 102 and VU client 114 is located in a Country A.

Process 500 starts in a Begin Setup Location Monitor and Control (LMC) block 502 and processed immediately to a "Download Configuration" block 504. During block 504, process 500, part of the execution of VU client 114, configured to implement the disclosed technology, retrieves configuration information (see block 302, FIG. 3) associated with the operation of VU client 114. Examples of retrieved information may include, but are not limited to, the location of a VU server such as VU server 134 (FIG. 1), a path to VU Simulation 138, an initial location within VU 200 (FIG. 2), location of avatar 202 in VU 200, physical location of the user who uses VU client 114 and logs in as avatar 202, whether or not LMC is enabled and restriction parameters associated with avatar 202. In this example, the downloaded information is retrieved from data storage 112, VU location of avatar 202 is detected by VU location module 416 and the real world location of the user that logs in as avatar 202 is determined by location module 310.

During a "Download VU" block 506, the user information associated with VU client 114 that enables VU client to instantiate VU 200 is downloaded, typically from a VU server such as VU server 124. Downloaded path information (see process block 504) is employed to instantiate VU 200. Examples of downloaded information include, but are not limited to, information relevant to avatar 202, location information relevant to the avatar's current location and any location restrictions that may be associated with either avatar 202 or the current location. In addition, any contextual information related to the current VU location is downloaded.

During an "LMC Enabled?" block 508, process 500 determines, based upon configuration and location information downloaded during blocks 504 and 506, whether or not VU client 114 is configured to support the disclosed technology. In addition, process 500 determines whether or not either VU client 114 and avatar 200, or both, are subject to location controls. Although, LMC technology may be applied to either or both VU client and avatar 202, the following description, for the sake of simplicity, describes the processing only from the viewpoint of an avatar based process.

If LMC is not enabled or avatar 202 is configured for location control, process 500 proceeds to a "Permitted Location?" block 512. Functionality associated with block 512 is described in more detail below. If process 500 determines that LMC is enabled and avatar 202 is configured to support the technology, control proceeds to an "Apply Rules" block 510. During block 510, process 500 correlates the location rules associated with the current location, VU client 114 and avatar 202 to location information received from avatar 202 and VU client 114.

During Permitted Location block 512, process 500 determines whether or not the rules and location information applied during block 510 permit avatar 202 to access the current location. If, because VU client 114 does not support the technology, control has been transferred directly to block 512 from block 508, location information is still able to block access to the current location. The rules are defined in Rule Set Module 418. The VU location of avatar 202 and the user's real world location are sent from the VU client 114 to Location Module 412 of a VU Simulator 128 during the synchronization between the VU client and VU Simulator. Location Control Module 420 on the VU Simulator 128 determines if avatar 202 can access the current location. In this manner, location control module 420 is under the control of particular locations so that avatars that are not appropriately configured may be denied access to the particular locations.

If the current location accepts entry by avatar 202, process 500 proceeds to an "Instantiate VU" block 514. During block 514, the current location is instantiated on client system 102 and avatar 202 is permitted to enter. It should be noted that the disclosed technology also provides for multiple levels of access. For example, avatar 202 may be permitted to enter a particular location but prevented from executing all or specific actions within the location. If, during block 512, process 500 determines that avatar 202 is not permitted in the current location, control proceeds to a "Report Error" block 516. In the alternative to simply denying an avatar entry to a particular location, the avatar may be permitted to enter a "dummy" location or a location that has been stripped of particular assets. In this manner, a location may appear to an unauthorized avatar to be empty or different than the accessed virtual location. Further, dummy controls may be provided such that an authorized avatar may experience the manipulation of objects in the virtual location, with no effect on actual or virtual objects and also to enable the collection of data on the unauthorized avatar.

During block 516, the user is notified that avatar 202 has been denied entry to the requested location and a message is transmitted to an administrator of the location to indicate the denial. In this manner, if access denial is in error, either or both the administrator and the user may take appropriate action to address the situation. Finally, once VU 200 has been instantiated during block 514 or a report is transmitted during block 516 control proceeds to an "End Setup LMC" block 519 in which process 500 is complete.

Figure 6:
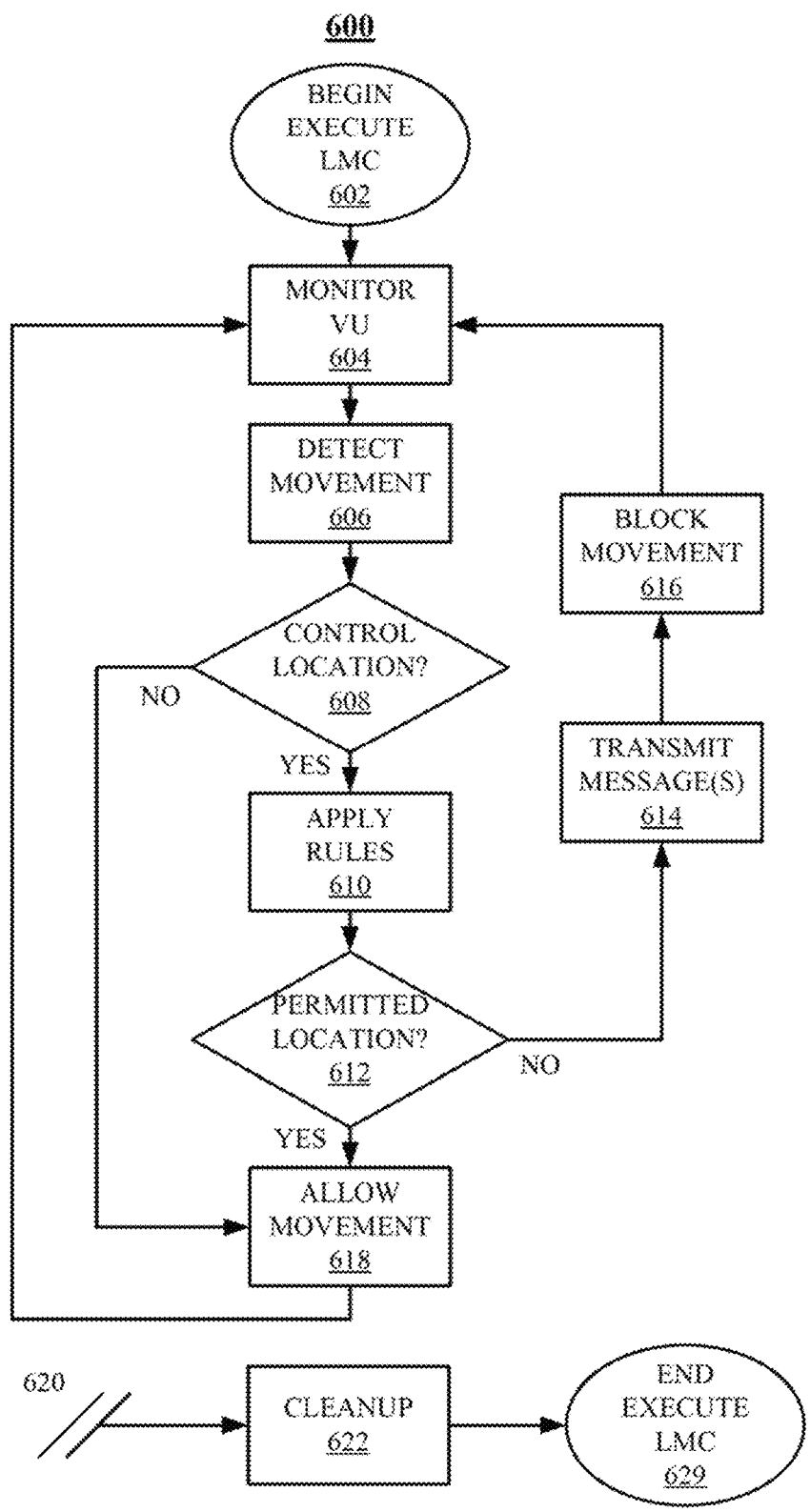
FIG. 6 is a flowchart of a LMC process that implements a portion of the claimed subject matter.

FIG. 6 is a flowchart of a Location Monitor and Control (LMC) process 600 the implements a portion of the claimed subject matter. In the following example process 600 is stored on data storage 126 (FIG. 1) and executes in conjunction with VU simulation 128 (FIGS. 1 and 4) on VU server 124 (FIG. 1). It should be noted that although Setup LMC process 500 is primarily focused on VU client 114, process 600 is primarily focused on VU simulation 128. In this manner, particular locations have control over access and permitted actions of an avatar regardless of whether or not the avatar itself is configured to support the claimed technology.

Process 600 starts in a "Begin Execute LMC" block 602 and proceeds immediately to "Monitor VU" block 604. During block 604, process 600 monitors VU 200 (FIG. 2) for the movement of avatars such as avatar 202 (FIG. 2). It should be noted that, although this description is directed to the detection of movement within VU 200, the claimed subject matter is also relevant to the detection and control of actions within VU 200. For example, a particular location may allow access but employ process 600 to prevent an unauthorized avatar from performing a particular action.

During a "Detect Movement" block 606, process 600 has detected the movement (or an attempt to perform an action) of avatar 202. The movement of avatar 202 is determined bye comparing the VU location of avatar 202 that VU Location Module 416 currently has with the VU location of avatar 202 that is received from VU Client 114 during a data synchronization between VU Client 114 and VU Simulator 128. During a "Control Location?" block 608, process 600 determines whether or not the movement or action detected during block 606 is associated with a location that is subject to the controls of the disclosed technology. If not, process 600 proceeds to an "Allow Movement" block 618 during which the movement or action is permitted.

If, during block 608, process 600 determines that the location is subject to location controls, process proceeds to an "Apply Rules" block 610. During block 610, process 600 applies rules, which are defined in rule set module 418, associated with the location to avatar 202, the position of the avatar 202 and the user's real world location (see modules 306, 308 and 310 of FIG. 3). The user's real world location is sent from location module 310 on VU Client 114 to VU Simulator 128 during the data synchronization between VU Client 114 and VU Simulator 128. During a "Permitted Location?" block 612, process 600 determines whether or not the rules applied during block 610 permit the execution of the requested movement or action. The decision is made by location control module 420. If not, control proceeds to a "Transmit Message(s)" block 614 during which process 600 informs avatar 202 that the movement or action is not permitted and also transmits a message to the appropriate administrator of the location concerning the denied attempt. During a "Block Movement" block 616, steps are taken to prevent avatar 202 from executing; the movement or action. Examples of blocking actions include, but are not limited to, removing avatar 200 from the denied location to an alternative location or simply freezing avatar 202 in the avatar's current location.

If, during block 612 process 600 determines that the movement or action is permitted, process 600 proceeds to Allow Movement block 618. Once the action or movement is executed process 600 returns to Monitor VU block 604 and processing continues as described above. Process 600 also returns to block 604 upon completion of processing associated with block 616.

Finally, process 600 is halted by means of an interrupt 620, which passes control to a "Cleanup" block 622. During block 622, actions such as, but not limited to, the release of memory that is no longer needed and the updating of configuration files are executed. During an "End Execute LMC" block 629, process 600 is complete. Interrupt 620 is typically generated when one of the OS, browser, VU server 124, VU simulator 128, etc. of which process 600 is associated is halted. During nominal operation, process 600 continuously loops through the blocks 604, 606, 608, 610, 612, 614, 616 and 618, processing the movement and actions of avatars within VU 200.

While the claimed subject matter has been shown and described with reference to particular embodiments thereof, it will be understood by those skilled in the an that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for controlling an avatar in a virtual environment, comprising:
   receiving a request from an avatar in a virtual environment to access a first virtual location;
   associating the avatar to a user;
   determining a physical location corresponding to the user;
   generating an entry status parameter, based upon a relationship between the physical location and the first virtual location that indicates whether or not the avatar is permitted to access the first virtual location, wherein the first virtual location is not a representation of the physical location;
   detecting that the entry status parameter indicates that the avatar is not permitted to access the first virtual location;
   denying the avatar access to the first virtual location in response to the detecting.

2. The method of claim 1, further comprising determining a physical location corresponding to a second user, wherein the detecting also takes into account a physical location corresponding to the second user.

3. The method of claim 1, further comprising verifying the identity of the user, wherein the detecting also takes into account the verifying of the identity of the user.

4. The method of claim 1, further comprising determining the physical location of the user by means of a global positioning system (GPS) module communicatively coupled to a computing device through which the user is accessing the virtual world.

5. A system for controlling an avatar in a virtual environment, comprising:
   a processor;
   a memory coupled to the processor;
   logic, stored on the memory and executed on the processor, for:
      receiving a request from an avatar in a virtual environment to access a first virtual location;
      associating the avatar to a user;
      determining a physical location corresponding to the user;
      applying a rule set, based upon the physical location corresponding to the user and the first virtual location, to generate an entry status parameter that indicates whether or not the avatar is permitted to access the first virtual location, wherein the first virtual location is not based upon the physical location; and
      in response to applying the rule set, taking an action from a list of actions, the list comprising:
         allowing the avatar access to the first virtual location in response to the entry status parameter indicating that the avatar is permitted to access the first virtual location; and denying the avatar access to the first virtual location in response to the entry status parameter indicating that the avatar is not permitted to access the first virtual location.

6. The system of claim 5, the logic further comprising logic for:
applying the rule set, based upon the physical location corresponding to the user and the first virtual location, to generate an interaction status parameter that indicates whether or not the avatar is permitted to execute a specified interaction in the first virtual location; and
preventing the avatar from executing the specified interaction in response to the interaction status parameter indicating that the avatar is not permitted to execute the specified interaction.

7. The system of claim 6, wherein the specified interaction is control of a real-world device via an interface in the virtual world.

8. The system of claim 5, the logic further comprising logic for determining a physical location corresponding to a second user, wherein applying the rule set also takes into account a physical location corresponding to the second user.

9. The system of claim 5, the logic further comprising logic for verifying the identity of the user, wherein the logic for applying the rule set also takes into account the verifying of the identity of the user.

10. The system of claim 5, the logic further comprising logic for:
determining that the user has moved to a second physical location;
reapplying the rule set to account for the move to the second physical location, thereby modifying the entry parameter, to produce a modified entry parameter; and
ejecting the avatar from the virtual location in response to the modified entry status parameter indicating that the avatar is not permitted access to the virtual location.

11. The system of claim 5, further comprising:
a global positioning system (GPS) module communicatively coupled to a computing device through which the user is accessing the virtual world; and
the logic further comprising logic for determining the physical location of the user by means of the GPS module.

12. A computer programming product for controlling an avatar in a virtual environment, comprising:
a memory;
logic, stored on the memory for execution on a processor, for:
receiving a request from an avatar in a virtual environment to access a first virtual location;
associating the avatar to a user;
determining a physical location corresponding to the user;
applying a rule set, based upon the physical location corresponding to the user and the first virtual location, to generate an entry status parameter that indicates whether or not the avatar is permitted to access the first virtual location, wherein the first virtual location is not based upon the physical location;
in response to applying the rule set, taking an action from a list of actions, the list comprising:
allowing the avatar access to the first virtual location in response to the entry status parameter indicating that the avatar is permitted to access the first virtual location; and
denying the avatar access to the first virtual location in response to the entry status parameter indicating that the avatar is not permitted to access the first virtual location.

13. The computer programming product of claim 12, the logic further comprising logic for:
applying the rule set, based upon the physical location corresponding to the user and the first virtual location, to generate an interaction status parameter that indicates whether or not the avatar is permitted to execute a specified interaction in the first virtual location; and
preventing the avatar from executing the specified interaction in response to the interaction status parameter indicating that the avatar is not permitted to execute the specified interaction.

14. The computer programming product of claim 13, wherein the specified interaction is control of a real-world device via an interface in the virtual world.

15. The computer programming product of claim 12, the logic further comprising logic for determining a physical location corresponding to a second user, wherein applying the rule set also takes into account a physical location corresponding to the second user.

16. The computer programming product of claim 12, the logic further comprising logic for verifying the identity of the user, wherein the logic for applying the rule set also takes into account the verifying of the identity of the user.

17. The computer programming product of claim 12, the logic further comprising logic for:
determining that the user has moved to a second physical location;
reapplying the rule set to account for the move to the second physical location, thereby modifying the entry parameter, to produce a modified entry parameter; and
ejecting the avatar from the virtual location in response to the modified entry status parameter indicating that the avatar is not permitted access to the virtual location.

* * * * *